(12) United States Patent
Leese et al.

(10) Patent No.: US 11,721,961 B2
(45) Date of Patent: Aug. 8, 2023

(54) MOUNTING MECHANISM FOR AN ELECTRICAL DEVICE

(71) Applicant: Lutron Technology Company LLC, Coopersburg, PA (US)

(72) Inventors: Jared A. Leese, Easton, PA (US); Joseph M. Nichols, Boyertown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 50 days.

(21) Appl. No.: 17/396,227

(22) Filed: Aug. 6, 2021

(65) Prior Publication Data

US 2021/0367414 A1    Nov. 25, 2021

Related U.S. Application Data

(63) Continuation of application No. 16/151,939, filed on Oct. 4, 2018, now Pat. No. 11,088,518.

(60) Provisional application No. 62/569,079, filed on Oct. 6, 2017.

(51) Int. Cl.
| | |
|---|---|
| *H02G 3/12* | (2006.01) |
| *F16M 13/00* | (2006.01) |
| *H02G 3/08* | (2006.01) |

(52) U.S. Cl.
CPC ............ *H02G 3/12* (2013.01); *F16M 13/005* (2013.01); *H02G 3/081* (2013.01); *H02G 3/085* (2013.01); *H02G 3/123* (2013.01)

(58) Field of Classification Search
CPC ............ H02G 3/08; H02G 3/081; H02G 3/10; H02G 3/12; H02G 15/06; H02G 3/00; H02G 3/085; H02G 3/123; H05K 5/00; H05K 5/02; F16M 13/005
USPC ....... 174/50, 53, 57, 58, 480, 481, 489, 542, 174/535, 61, 63, 502; 220/3.2–3.9, 4.02; 248/906
See application file for complete search history.

(56) References Cited

U.S. PATENT DOCUMENTS

| | | |
|---|---|---|
| 4,304,957 A | 12/1981 | Slater et al. |
| 5,434,359 A | 7/1995 | Schnell |
| 6,170,685 B1 | 1/2001 | Currier |
| (Continued) | | |

FOREIGN PATENT DOCUMENTS

| | | |
|---|---|---|
| EP | 0706250 A1 | 4/1996 |
| EP | 1722472 B1 | 7/2015 |
| (Continued) | | |

*Primary Examiner* — Angel R Estrada
(74) *Attorney, Agent, or Firm* — Michael Czarnecki; Glen Farbanish; Philip Smith

(57) ABSTRACT

An apparatus, such as an electrical device or a wall box, may have a mounting mechanism that may be configured to mount the apparatus to a wall in a manner that may facilitate secure fastening to the wall. The apparatus may comprise at least one mounting clamp that may have a fin and a drum that receives a mounting screw. The fin of the mounting clamp may be configured to be located within a pocket formed in the body. When a mounting screw is driven, the mounting clamp may rotate from the pocket into a position in which the drum of the mounting clamp may be received in a channel formed in the body. The drum may be configured to move through the channel as the mounting screw is further driven. The gap may be sized to retain the mounting clamp within the channel as the drum moves therethrough.

16 Claims, 9 Drawing Sheets

(56) References Cited

U.S. PATENT DOCUMENTS

| | | |
|---|---|---|
| 6,573,446 B1 | 6/2003 | Umstead et al. |
| 7,078,618 B2 | 7/2006 | Dinh |
| 7,595,446 B2 | 9/2009 | Turcovsky et al. |
| 8,049,107 B2 | 11/2011 | Dinh |
| 8,242,360 B2 | 8/2012 | Bercy, Sr. |
| 8,269,102 B1 | 9/2012 | Baldwin et al. |
| 8,445,779 B1 | 5/2013 | Gretz |
| 11,088,518 B2 * | 8/2021 | Leese .................. H02G 3/12 |

FOREIGN PATENT DOCUMENTS

| | | |
|---|---|---|
| FR | 2780567 A1 | 12/1999 |
| FR | 3011139 A1 | 3/2015 |

* cited by examiner

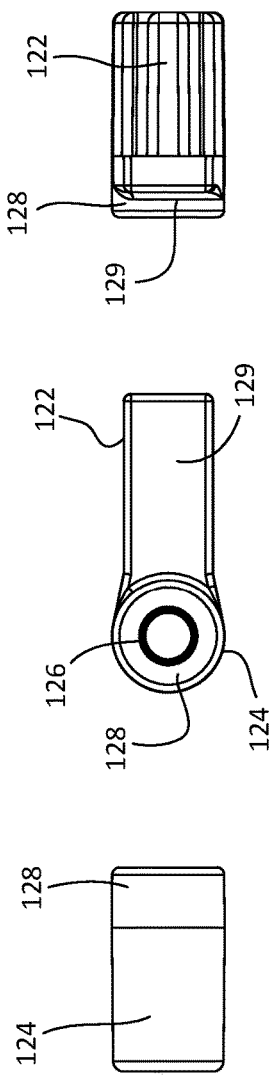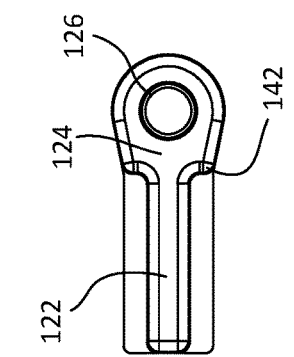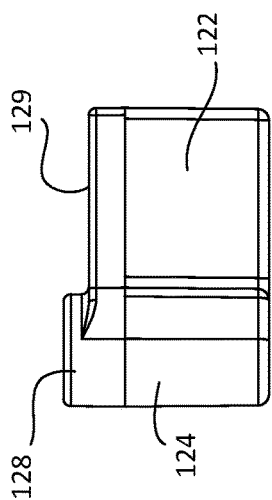
FIG. 8G
FIG. 8F
FIG. 8E
FIG. 8B
FIG. 8A
FIG. 8C
FIG. 8D

MOUNTING MECHANISM FOR AN ELECTRICAL DEVICE

CROSS-REFERENCE TO RELATED APPLICATIONS

This application is a continuation of U.S. patent application Ser. No. 16/151,939 filed Oct. 4, 2018, which claims the benefit of U.S. Provisional Patent Application No. 62/569,079, filed Oct. 6, 2017, the entire disclosures of which are hereby incorporated by reference.

BACKGROUND

Electrical devices and electrical wall boxes for mounting electrical devices are well known. A typical electrical wall box includes a housing that is installed within a wall. An electrical wall box is typically configured to receive at least one electrical device, such as a switch or a receptacle, for example. A typical electrical wall box is also configured to receive a wall plate. The wall plate may be adapted to cover a yoke plate and/or escutcheon of the electrical devices mounted within the wall box. The wall plate may be configured to be attached to the electrical device with or without fasteners.

Some prior art electrical wall boxes may be mounted to the wall by rear-located clamps that clamp the wall between a flange of the wall box and the clamps. The wall boxes may comprise a screw having a head that is located at the front of the wall box and may be driven to pull the clamp towards the flange of the wall box. If terminal ends of the screws opposite the heads are free-floating, the clamps can become dislodged from the wall box and get stuck before completing the clamping action to the wall.

SUMMARY

As described herein, a mounting mechanism for an apparatus may be configured to mount the apparatus within a wall, for example, in a manner that facilitates secure fastening of the apparatus to the wall. For example, the apparatus may comprise an electrical device (e.g., such as a keypad for a load control system) or a wall box in which an electrical device may be mounted. The apparatus may include a body having a front surface. For example, the body may define an opening of a wall box configured to receive one or more electrical devices. The body may also define an enclosure of an electrical device. The body may comprise a flange that at least partially surrounds the body (e.g., the opening of the body) and defines the front surface of the body. The apparatus may include one or more mounting screws having a head that may be maintained adjacent to the front surface of the body (e.g., adjacent to the flange) and may extend through a channel formed in the body. Each mounting clamp may include a fin and a drum that defines a bore configured to receive the mounting screw. Each mounting screw may define a terminal end (e.g., distal from the head) that is configured to extend beyond the mounting clamp and be free-floating. The fin may define a front surface. The fin of the mounting clamp may be configured to be located in (e.g., received within) a pocket formed in the body. The drum may define a foot. The foot may extend beyond the front surface of the fin such that the foot is configured to be located within the channel when the fin is located within the pocket.

When the head of the mounting screw is driven, the mounting clamp may be configured to be rotated from the pocket into a position in which the drum of the mounting clamp may be received in the channel. For example, the mounting clamp may be configured to rotate from the pocket until a knee of the mounting clamp contacts an edge surface of the pocket. The drum of the mounting clamp may be configured to move within the channel as the head of the mounting screw is further driven, and the fin of the mounting clamp may be configured to extend through a gap defined by the channel. For example, the drum may be configured to move within the channel until the fin (e.g., the front surface of the fin) abuts the wall such that the wall is clamped between the flange and the fin. The gap may be configured to prevent the drum of the mounting clamp from exiting the channel through the gap. The gap may define a first width and the channel may define a second width. The second width may be greater than the first width such that the mounting clamp is retained within apparatus. The mounting clamp may be configured to be driven from the channel to the pocket such that the apparatus is configured to be removed from the wall.

BRIEF DESCRIPTION OF THE DRAWINGS

FIGS. 8A-8F are projection views of one of the mounting clamps of the example electrical wall box of FIG. 1.

FIG. 8G is a perspective view of the mounting clamp of FIGS. 8A-8F.

DETAILED DESCRIPTION

Figure 1:
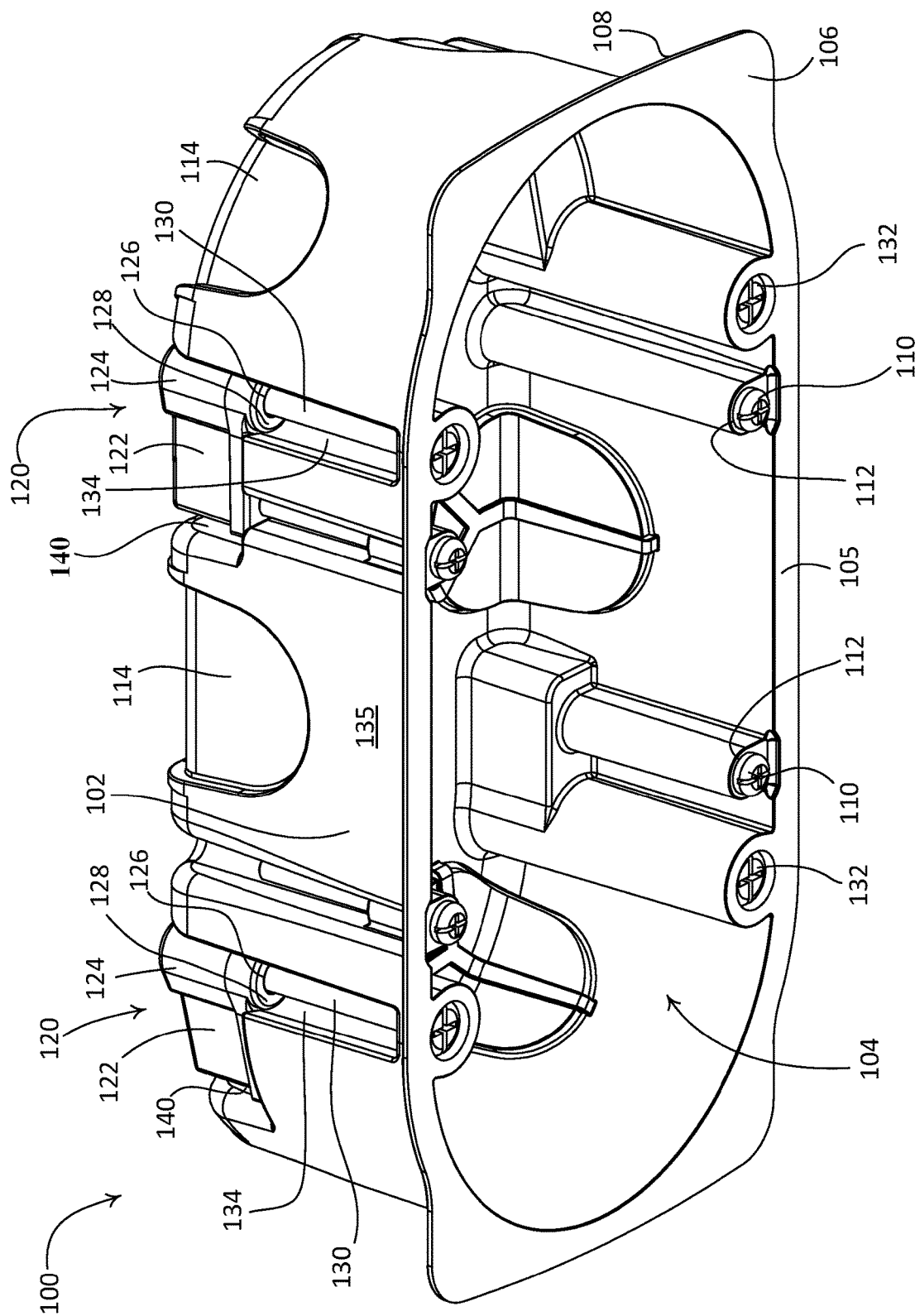
FIG. 1 is a front perspective view of an example electrical wall box having multiple mounting clamps shown located in pockets.

FIGS. 1-7 depict an example electrical wall box 100. The electrical wall box 100 may comprise a body 102 that defines an opening 104 that is configured to receive one or more wall-mounted electrical devices (not shown), such as a dimmer switch or a keypad of a lighting control system. The electrical wall box 100 may be configured to be inserted within an opening in a wall (e.g., such as drywall, plaster, wood paneling, etc.). The body 102 of the electrical wall box 100 may define a front surface 105 that may be located outside of the wall when the electrical wall box 100 is inserted into the opening in the wall. The body 102 may further comprise a flange 106 that may at least partially surround the body 102 and may define the front surface 105 of the body 102. For example, the flange 106 may at least partially surround the opening 104 of the body 102. The flange 106 may comprise a rear surface 108. The rear surface 108 may be configured to abut against the wall when the electrical wall box 100 is inserted into the opening in the wall. The wall-mounted electrical device may be fastened to the electrical wall box 100 using attachment screws 110 received through openings 112 in the electrical wall box 100. The electrical wall box 100 may include one or more knock-outs 114 that may be removed to create openings in the electrical wall box through which one or more electrical wires (e.g., that may be connected to electrical circuitry of one or more of the electrical devices) may extend. The body 102 may be configured to enclose the electrical circuitry of the electrical device (e.g., that are mounted in the electrical wall box 100).

The electrical wall box 100 may include a mounting mechanism including one or more mounting clamps 120 (e.g., four mounting clamps) that may be used to mount the electrical wall box 100 to the wall. FIGS. 8A-8F are projection views and FIG. 8G is a perspective view of one of the mounting clamps 120. The mounting clamp 120 may include a fin 122 connected to a drum 124. The fin may define a front surface 129. The front surface 129 may be configured to abut the wall (e.g., the opposite wall surface than the flange 106 engages). The drum 124 may define a bore 126 running therethrough. For example, the bore 126 may run through a center of the drum 124. The drum 124 may define a foot 128 that extends beyond the front surface 129 of the fin 122. As shown in FIGS. 1-7, the bore 126 of the drum 124 of each mounting clamp 120 may receive a respective mounting screw 130. The mounting clamps 120 may be threaded onto the mounting screws 130. For example, the bore 126 may be threaded onto a respective mounting screw 130. Each mounting screw 130 may extend through an opening 131 in the body 102. For example, the openings 131 may be located in the body 102 adjacent to the flange 106. Each mounting screw 130 may have a head 132 that may be maintained at a location adjacent to the flange 106 (e.g., at the front) of the electrical wall box 100. Each mounting screw 130 may extend through a respective channel 134 that is formed in sidewalls 135 of the body 102 of the electrical wall box 100. The mounting screws 130 may have terminal ends 136 opposite the heads 132 that may be free-floating (e.g., as shown in FIGS. 3 and 5). For example, the drum 124 and the channel 134 may be configured to maintain alignment of the mounting screws 130 within the electrical wall box 100.

Figure 2:
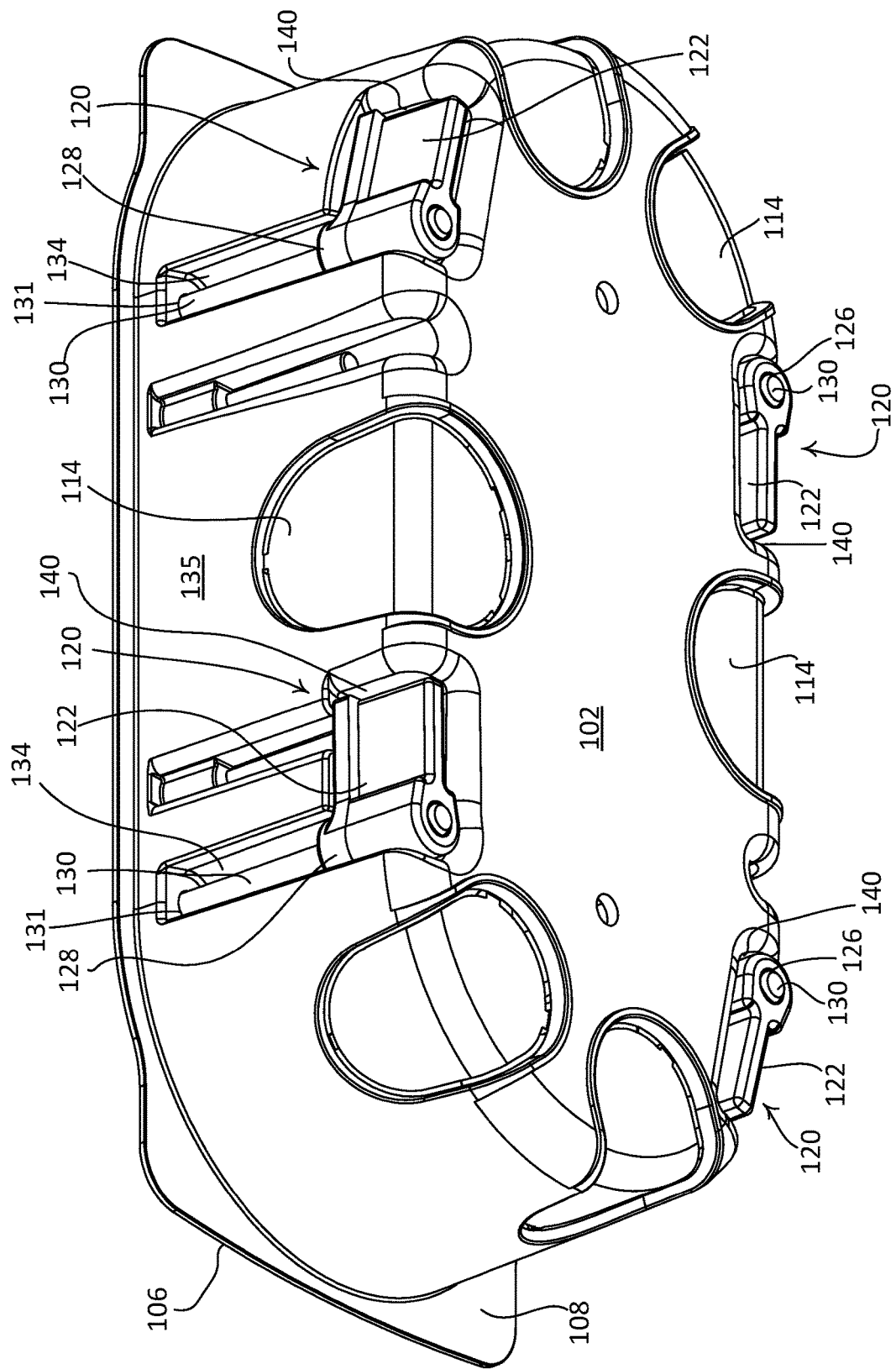
FIG. 2 is a rear perspective view of the example electrical wall box of FIG. 1.
Figure 3:
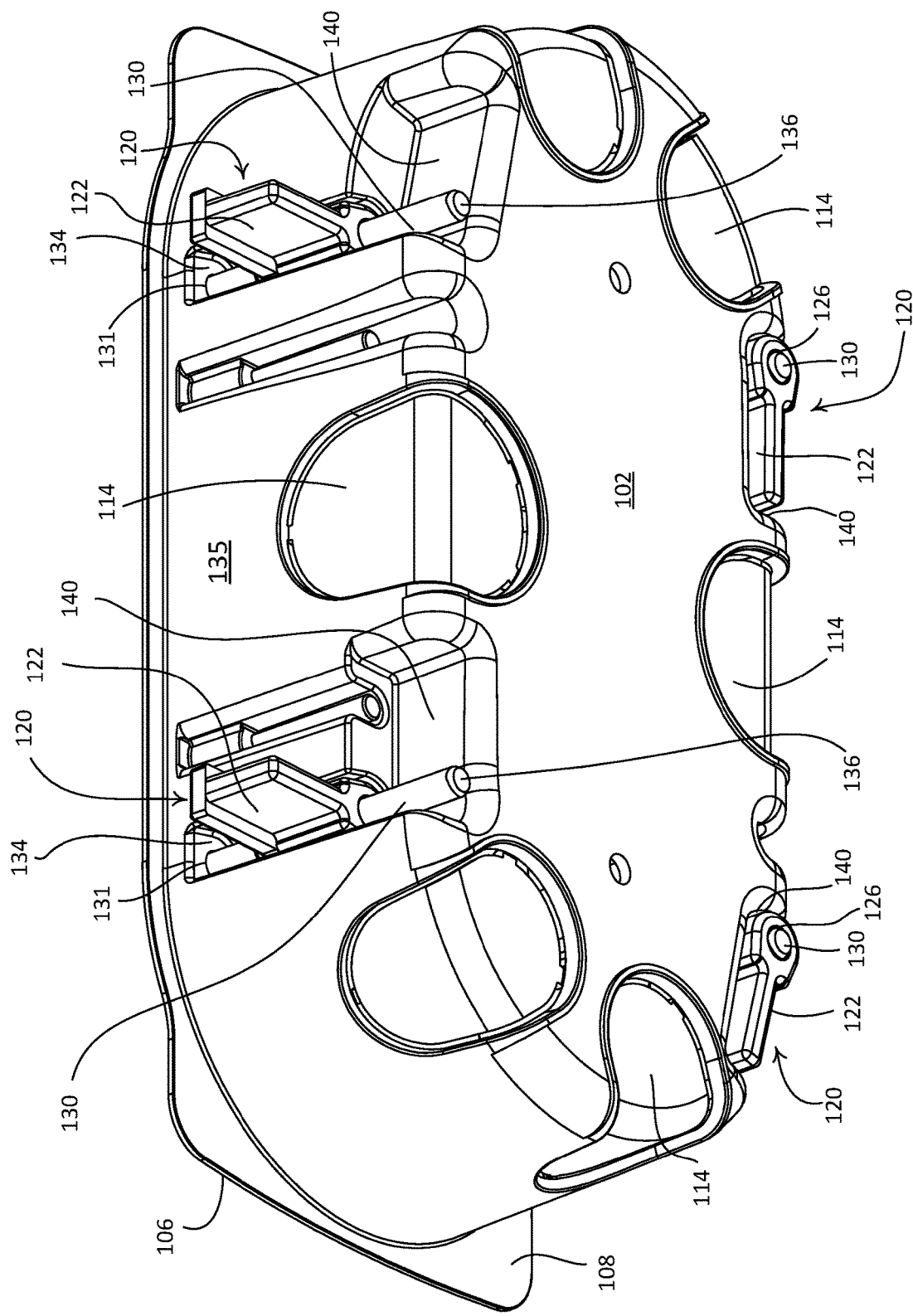
FIG. 3 is a rear perspective view of the example electrical wall box of FIG. 1 with two lower mounting clamps shown in respective pockets and two upper mounting clamps shown in respective channels.

As shown in FIGS. 1 and 2, the mounting clamps 120 may be located in initial positions (e.g., installation positions), for example, prior to insertion of the electrical wall box 100 into the opening in the wall. When a respective one of the mounting clamps 120 is in the initial position, the fin 122 of the respective one of the mounting clamps 120 may be located in a respective pocket 140 that is formed in the body 102 of the electrical wall box 100. In addition, the foot 128 of the respective one of the mounting clamps 120 may be located (e.g., partially located) within the respective channel 134 when the respective one of the mounting clamps 120 is in the initial position. For example, the foot 128 may be located within a respective channel 134 when the fin 122 is within the respective pocket 140. When the mounting clamps 120 are located in the respective pockets 140, the mounting clamps 120 may not extend beyond an outer periphery of the body 102 of the electrical wall box 100. Thus, the electrical wall box 100 may be configured to be inserted into the opening in the wall when the mounting clamps 120 are located in the initial positions.

Figure 4:
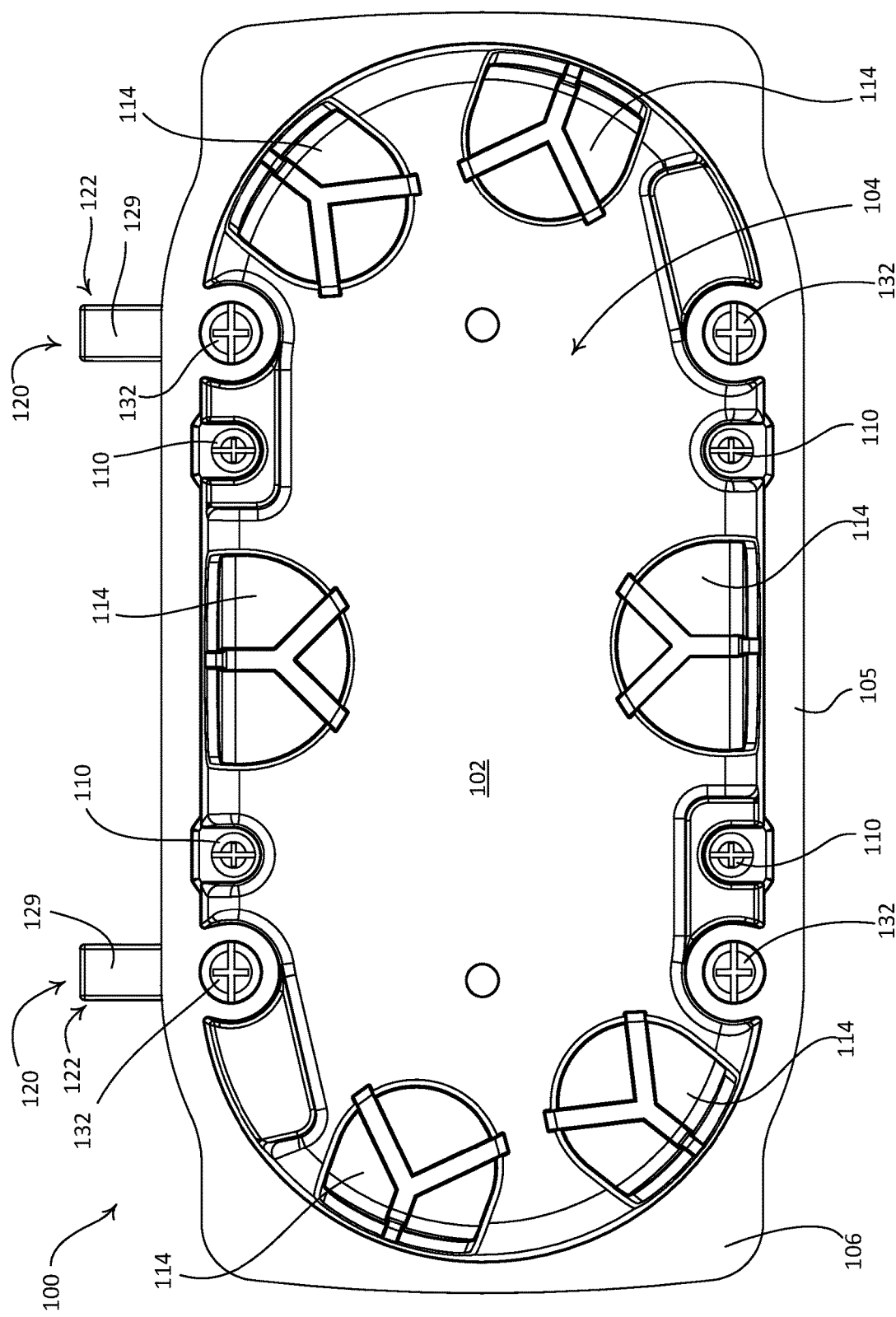
FIG. 4 is a front view of the example electrical wall box of FIG. 3.
Figure 5:
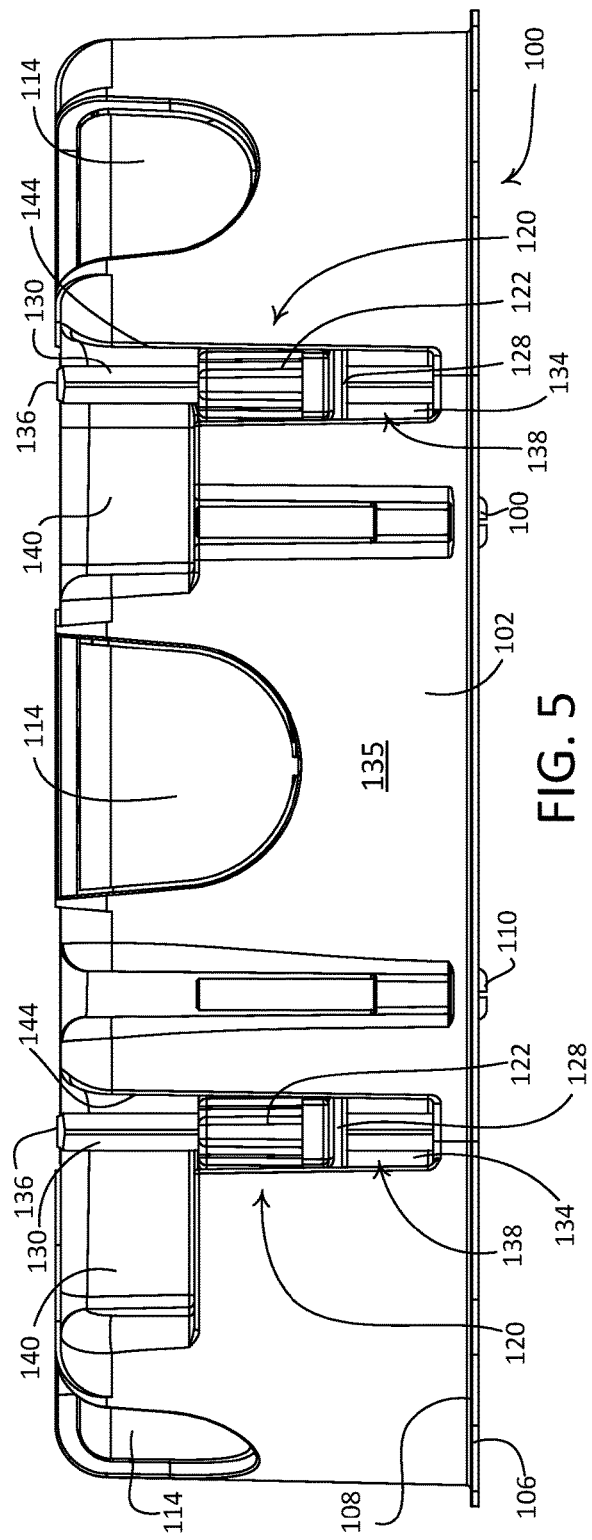
FIG. 5 is a top view of the example electrical wall box of FIG. 3 showing the two upper mounting clamps in the channels.
Figure 6:
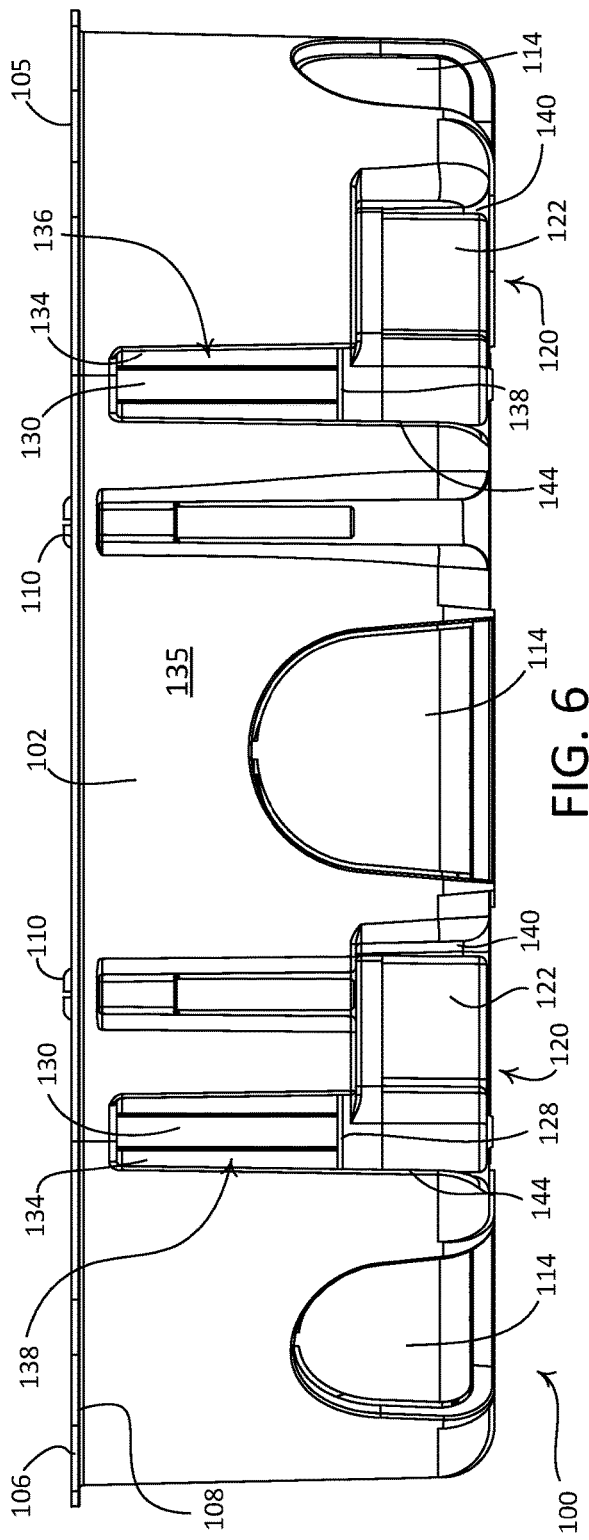
FIG. 6 is a bottom view of the example electrical wall box of FIG. 3 showing the two lower mounting clamps in the pockets.

To mount the electrical wall box 100 to the wall, the heads 132 of the mounting screws 130 may be driven with a screwdriver which may cause the fins 122 of the mounting clamps 120 to rotate from the pockets 140 (e.g., clockwise as shown in FIGS. 1 and 4). For example, the mounting clamps 120 may be configured to rotate when the mounting screws 130 are rotated. The mounting screws 130 and the fins 122 of the mounting clamps 120 may rotate until a knee 142 of the mounting clamps 120 abuts an edge surface 144 of the pockets 140. The edge surface 144 may extend into the respective channels 134. For example, each channel 134 may be characterized by a diameter of approximately 0.321 inches. When the knee 142 abuts the edge surface 144, the fin 122 may be substantially perpendicular to the respective sidewall 135 of the electrical wall box 100. Since the foot 128 of the drum 124 is located within the respective channel 134 when the mounting clamps 120 are in the initial position, the foot 128 may be configured such that the mounting screws 130 remain in position within (e.g., in the center of) the respective channels 134 as the fin 122 rotates from the respective pockets 140 until the knee 142 of the mounting clamps 120 abuts the respective edge surface 144. When the knee 142 contacts the respective edge surface 144, the drum 124 of the mounting clamps 120 may begin to move into the respective channel 134 towards the front of electrical wall box 100, for example, in response to continued rotation of the head 132 of the mounting screw 130.

Figure 7:
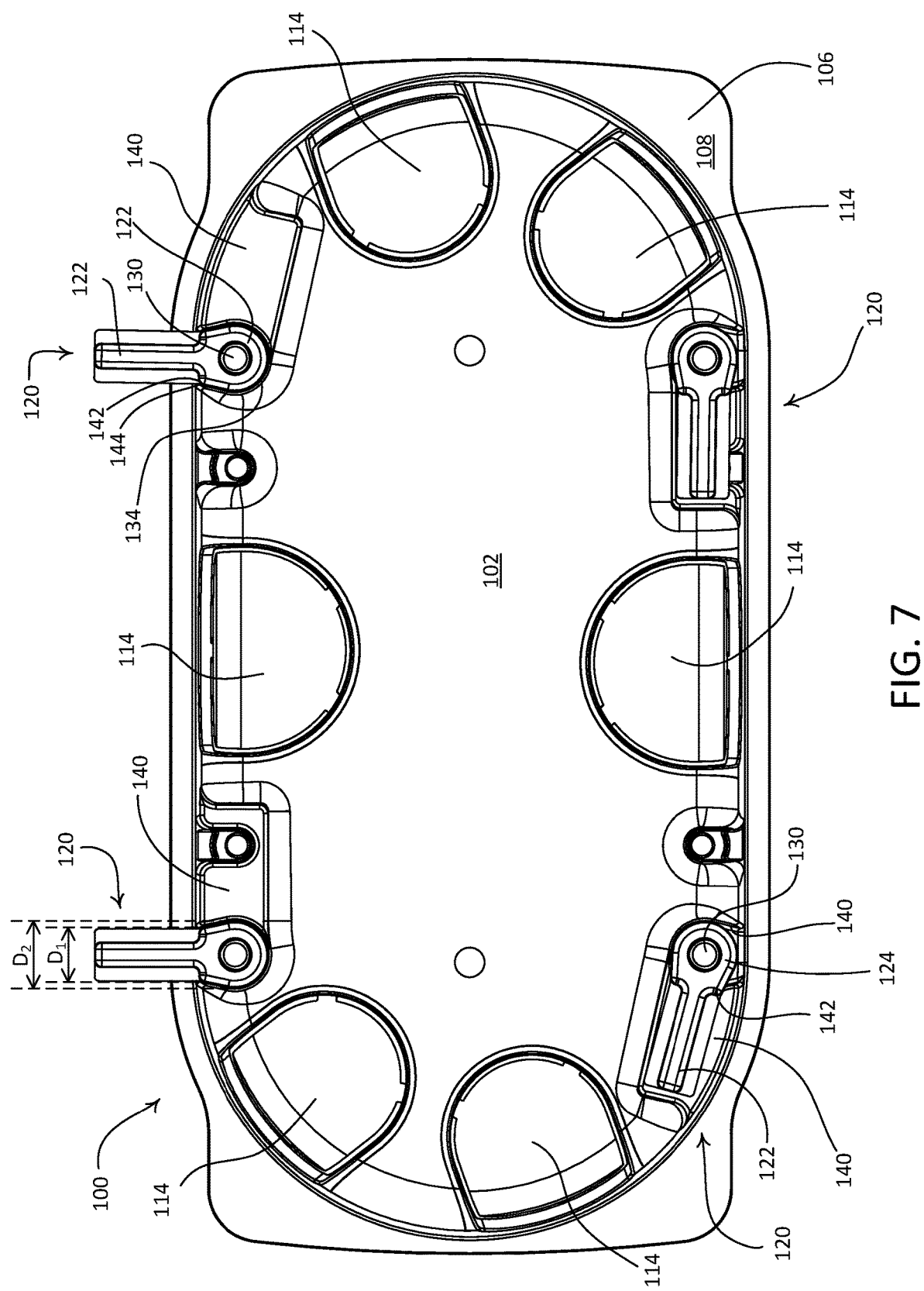
FIG. 7 is a front view of the example electrical wall box of FIG. 3.

FIGS. 3-7 show the lower two of the mounting clamps 120 in the respective pockets 140 (e.g., in the initial positions) and the upper two of the mounting clamps 120 in the respective channels 134. The channels 134 may be configured such that the mounting clamps 120 are retained within the electrical wall box 100 (e.g., within the channels 134). For example, each of the channels 134 may define a gap 138. The gap 138 may be located at the outer periphery of the body 102 of the electrical wall box 100. The fin 122 of the mounting clamps 120 may extend through the gap 138 when the drum 124 is located within the respective channel 134. The gap 138 may have a width $D_1$ (e.g., approximately 0.285 inches) as shown in FIG. 7. The drum 124 of the mounting clamp 120 may define a width $D_2$ (e.g., approximately 0.315 inches) as shown in FIG. 7. The width $D_1$ may be less than the width $D_2$ such that the drum 124 may be prevented from exiting the channel 134 through the gap 138, for example, as the mounting clamps 120 move towards the flange 106.

As each mounting screw 130 is continued to be driven, the respective mounting clamp 120 may move through the channel 134 towards the flange 106. For example, the drum 124 may move within the channels 134 until the fin 122 abuts an opposite side of the wall as the flange 106. The mounting clamps 120 may clamp the electrical wall box 100 to the wall when the fin 122 abuts the opposite side of the wall as the flange 106. At this time, the mounting clamps 120 may be located in a clamped position. When in the clamped position, the drum 124 may remain within the channel 134 and the fin 122 may engage the wall.

The electrical wall box 100 may be configured to be removed from the wall. The mounting screws 130 may be driven in the opposite direction (e.g., counter-clockwise) to unclamp the electrical wall box 100 from the wall. For example, the drum 124 may move within the channel 134 away from the wall as the mounting screws 130 are driven in the counter-clockwise direction. When the mounting screws 130 are driven in the counter-clockwise direction, the channels 134 may be configured to prevent the fins 122 from rotating until the drum 124 reaches the end of the respective channels 134. The mounting clamps 120 may each be driven away from the wall and may be rotated back to the initial position such that the electrical wall box 100 may be removed from the wall. The fins 122 may be configured to rotate back within the respective pockets 140 when the mounting clamps 120 reach the end of the channels 134. For example, the fins 122 may each rotate back within the respective pocket 140 when the front surface 129 is aligned with the pocket. The electrical wall box 100 may be transparent (e.g., partially transparent) such that a user can determine if the mounting clamps 120 are each in the initial position by looking through the body 102 and/or flange 106 of the electrical wall box 100. For example, the body 102 and/or the flange 106 may define one or more transparent sections configured to enable inspection of the pockets 140.

Figure 9:
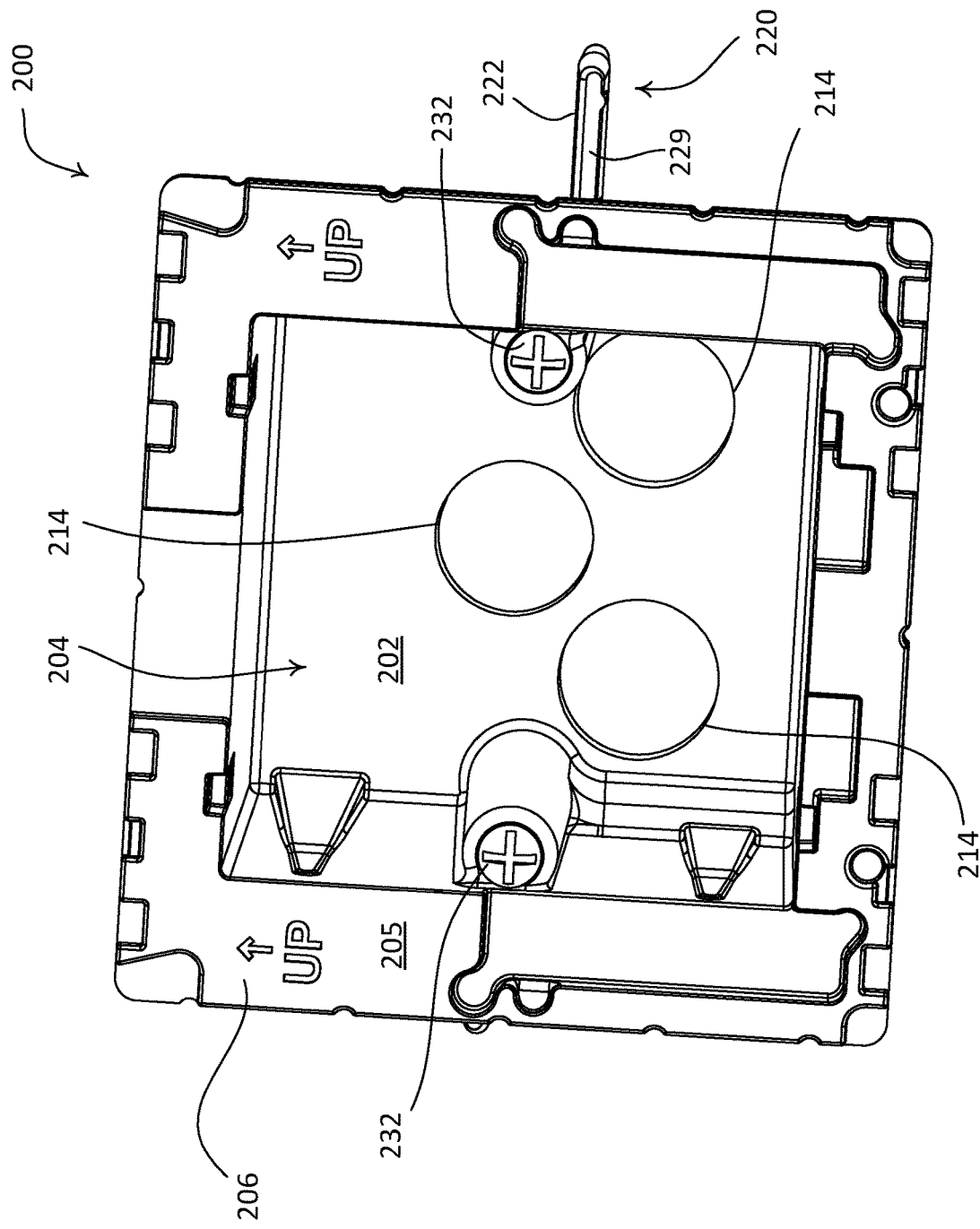
FIG. 9 is a front perspective view of another example electrical wall box having multiple mounting clamps.
Figure 10:
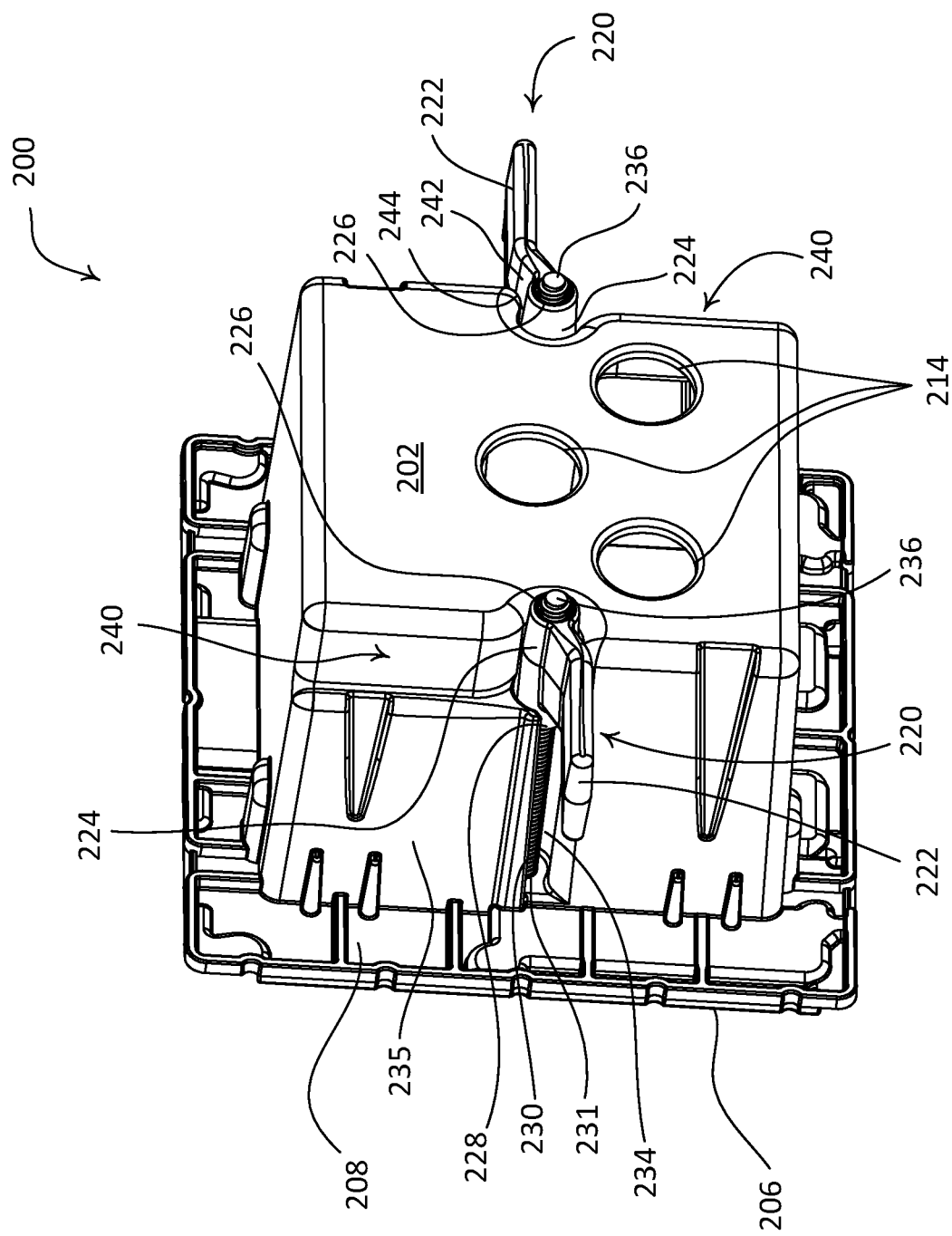
FIG. 10 is a rear perspective view of the example electrical wall box of FIG. 9.

FIGS. 9 and 10 depict another example electrical wall box 200. The electrical wall box 200 may comprise a body 202 that defines an opening 204 configured to receive one or more wall-mounted electrical devices (not shown), such as a dimmer switch or a keypad of a lighting control system. The electrical wall box 200 may be configured to be inserted within an opening in a wall (e.g., such as drywall, plaster, wood paneling, etc.). The body 202 of the electrical wall box 200 may define a front surface 205 that may be located outside of the wall when the electrical wall box 200 is inserted into the opening in the wall. The body 202 may further comprise a flange 206 that may at least partially surround the body 202 and may define the front surface 205 of the body 202 (e.g., at least partially surround the opening 204 of the body). The flange 206 may comprise a rear surface 208 that may be configured to abut against the wall when the electrical wall box 200 is inserted into the opening in the wall. The wall-mounted electrical device may be fastened to the electrical wall box 200, for example, by snapping to the electrical wall box. The electrical wall box 200 may include one or more apertures 214 through which one or more electrical wires (e.g., that may be connected to electrical circuitry of one or more of the electrical devices) may extend. The body 202 may be configured to enclose the electrical circuitry of the electrical device (e.g., that are mounted in the electrical wall box 200).

The electrical wall box 200 may include a mounting mechanism including one or more mounting clamps 220 (e.g., two mounting clamps) that may be used to mount the electrical wall box 200 to the wall. The mounting clamp 220 may include a fin 222 connected to a drum 224. The fin may define a front surface 229. The front surface 229 may be configured to abut the wall (e.g., the opposite wall surface than the flange 206 engages). The drum 224 may define a bore 226 running therethrough. For example, the bore 226 may run through a center of the drum 224. The drum 224 may define a foot 228 that extends beyond the front surface 229 of the fin 222. As shown in FIG. 9, the bore 226 of the drum 224 of each mounting clamp 220 may receive a respective mounting screw 230. The mounting clamps 220 may be threaded onto the mounting screws 230. For example, the bore 226 may be threaded onto a respective mounting screw 230. Each mounting screw 230 may extend through an opening 231 in the body 202. For example, the openings 231 may be located in the body 202 adjacent to the flange 206. Each mounting screw 230 may have a head 232 that may be maintained at a location adjacent to the flange 206 (e.g., at the front) of the electrical wall box 200. Each mounting screw 230 may extend through a respective channel 234 that may be formed in sidewalls 235 of the body 202 of the electrical wall box 200. The mounting screws 230 may have terminal ends 236 opposite the heads 232 that may be free-floating (e.g., as shown in FIG. 10). For example, the drum 224 and the channel 234 may be configured to maintain alignment of the mounting screws 230 within the electrical wall box 200.

The mounting clamps 220 may be located in initial positions (e.g., installation positions) prior to insertion of the electrical wall box 200 into the opening in the wall. When a respective one of the mounting clamps 220 is in the initial position, the fin 222 of the respective one of the mounting clamps 220 may be located in a respective pocket 240 that is formed in the body 202 of the electrical wall box 200. In addition, the foot 228 of the respective one of the mounting clamps 220 may be located (e.g., partially located) within the respective channel 234 when the respective one of the mounting clamps 220 is in the initial position. For example, the foot 228 may be located within a respective channel 234 when the fin 222 is within the respective pocket 240. When the mounting clamps 220 are located in the respective pockets 240, the mounting clamps 220 may not extend beyond an outer periphery of the body 202 of the electrical wall box 200. Thus, the electrical wall box 200 may be configured to be inserted into the opening in the wall when the mounting clamps 220 are located in the initial positions.

To mount the electrical wall box 200 to the wall, the heads 232 of the mounting screws 230 may be driven with a screwdriver which may cause the fins 222 of the mounting clamps 220 to rotate from the pockets 240 (e.g., as the mounting screws 230 are rotated). The mounting screws 230 and the fins 222 of the mounting clamps 220 may rotate until a knee 242 of the mounting clamps 220 abuts an edge surface 244 of the pockets 240. The edge surface 144 may extend into the respective channels 234. When the knee 242 abuts the edge surface 244, the fin 222 may be substantially perpendicular to the respective sidewall 235 of the electrical wall box 200. Since the foot 228 of the drum 224 is located within the respective channel 234 when the mounting clamps 220 are in the initial position, the foot 228 may be configured such that the mounting screws 230 remain in position within (e.g., in the center of) the respective channels 234 as the fin 222 rotates from the respective pockets 240 until the knee 242 of the mounting clamps 220 abuts the respective edge surface 244. When the knee 242 contacts the respective edge surface 244, the drum 224 of the mounting clamps 220 may begin to move into the respective channel 234 towards the front of electrical wall box 200, for example, in response to continued rotation of the head 232 of the mounting screw 230.

The channels 234 may be configured such that the mounting clamps 220 are retained within the electrical wall box 200 (e.g., within the channels 234). For example, each of the channels 234 may define a gap that may be located at the outer periphery of the body 202 of the electrical wall box 200. The fin 222 of the mounting clamps 220 may extend through the gap when the drum 224 is located within the respective channel 234. As each mounting screw 230 is continued to be driven, the respective mounting clamp 220 may move through the channel 234 towards the flange 206. The gap may have a width that is less than a width of the drum 224, such that the drum 224 may be prevented from exiting the channel 234 through the gap 238, for example, as the mounting clamps 220 move towards the flange 206. The drum 224 may move within the channels 234 until the fin 222 abuts an opposite side of the wall as the flange 206. The mounting clamps 220 may clamp the electrical wall box 200 to the wall when the fin 222 abuts the opposite side of the wall as the flange 206, at which time the mounting clamps 220 may be located in a clamped position. When the mounting clamps 220 are in the clamped position, the drum 224 may remain within the channel 234 and the fin 222 may engage the wall.

The electrical wall box 200 may be configured to be removed from the wall. The mounting screws 230 may be driven in the opposite direction to unclamp the electrical wall box 200 from the wall. For example, the drum 224 may move within the channel 234 away from the wall as the mounting screws 230 are driven. The channels 234 may be configured to prevent the fins 222 from rotating until the drum 224 reaches the end of the respective channels 234 as the mounting screws 230 are driven. The mounting clamps 220 may each be driven away from the wall and may be rotated back to the initial position such that the electrical wall box 200 may be removed from the wall. The fins 222 may be configured to rotate back within the respective pockets 240 when the mounting clamps 220 reach the end of the channels 234. For example, the fins 222 may each rotate back within the respective pocket 240 when the front surface 229 is aligned with the pocket. The electrical wall box 200 may be transparent (e.g., partially transparent) such that a user can determine if the mounting clamps 220 are each in the initial position by looking through the body 202 and/or flange 206 of the electrical wall box 200. For example, the body 202 and/or the flange 206 may define one or more transparent sections configured to enable inspection of the pockets 240.

While the mounting mechanism of the present disclosure has been described with reference to the mounting clamps 120, 220 attached to mounting screws 134, 234 received in the channels 134, 234 formed in the body 102, 202 of electrical wallboxes 100, 200, respectively, other types of devices could have similar mounting mechanisms. For example, an electrical device may comprise an enclosure, e.g., a housing (not shown), comprising channels for receipt of mounting screws having mounting clamps (e.g., similar to the channels 134, 234, mounting screws 130, 230, and mounting clamps 120, 220, respectively, as described herein). In other words, the mounting mechanism as described herein may be integral to the electrical device. For example, such an electrical device may comprise a control device (e.g., a low-voltage or battery-powered control device, such as a keypad for a load control system) that may not require an electrical wall box to be installed in a wall.

The invention claimed is:

1. A wall box installable in a hollow wall, the wall box comprising:
  a rotatable attachment feature including a body having a fin portion coupled to a drum portion, the drum portion including a female threaded aperture;
  a wall box body having an obstructed end and an open end, the body including a recess formed on an external surface of the wall box body, the recess including:
    a channel fluidly-coupled to a void space, the channel and void space formed on an external surface of the body, the void space to accommodate the rotatable attachment feature in a $1^{st}$ position adjacent a side of the wall box body;
      wherein the drum portion of the rotatable attachment feature includes a cylindrical portion having a first diameter; and wherein the channel comprises a channel having a width greater than the first diameter; and
    wherein the channel further includes a throat portion having a width less than the first diameter such that the drum portion of the rotatable attachment feature is trapped within the channel;
  a flange coupled to and extending laterally outward from the open end of the wall box body;
  a male threaded fastener having a length and disposed in the channel and engaging the female threaded aperture in the drum portion of the rotatable attachment feature;
    wherein, in response to a rotation of the threaded fastener in a first direction, the attachment feature rotates to a $2^{nd}$ position in which the fin portion extends at an angle from wall box body;
    wherein, in response to a continued rotation of the threaded fastener in the first direction, the attachment feature travels in an upward direction along the length of the threaded fastener such that the hollow wall is trapped between the fin portion and the flange.

2. The wall box of claim 1 wherein, in the $2^{nd}$ position, the fin portion extends at an angle of about 90 degrees with respect to the external surface of the wall box body.

3. The wall box of claim 1 wherein the wall box body defines a generally oval shape.

4. The wall box of claim 1 wherein the wall box body defines a generally rectangular shape.

5. The wall box of claim 1 wherein the flange extends about the perimeter of the open end of the wall box body.

6. The wall box of claim 1 wherein, in response to a rotation of the threaded fastener in a second direction opposite the first direction, the attachment feature travels in a downward directly along the length of the threaded fastener, releasing the hollow wall from between the fin portion and the flange.

7. The wall box of claim 6 wherein, in response to a continued rotation of the threaded fastener in the second direction, the attachment feature transitions from the $2^{nd}$ position back to the $1^{st}$ position in which the rotatable attachment feature is adjacent a side of the wall box body, thereby permitting removal of the wall box from the hollow wall.

8. The wall box of claim 1 wherein the fin portion of the attachment feature comprises a rectangular member and the drum portion of the rotatable attachment feature comprises a cylindrical member.

9. A wall box installable in a hollow wall, the wall box comprising:
  a rotatable attachment feature including a body having a fin portion coupled to a drum portion, the drum portion including a female threaded aperture;
  a wall box body having an open end, the body including a recess formed on an external surface of the wall box body, the recess including:
    a channel fluidly-coupled to a void space, the channel and void space formed on an external surface of the body, the void space to accommodate the rotatable attachment feature in a $1^{st}$ position adjacent a side of the wall box body;
  wherein the drum portion of the rotatable attachment feature includes a cylindrical portion having a first diameter; and wherein the channel comprises a channel having a width greater than the first diameter; and
  wherein the channel further includes a throat portion having a width less than the first diameter such that the drum portion of the rotatable attachment feature is trapped within the channel;
  a flange coupled to and extending laterally outward from the open end of the wall box body;
    wherein, responsive to a rotation of a male threaded fastener in a first direction, the rotatable attachment feature rotates into a $2^{nd}$ position in which the fin portion extends at an angle from the wall box body and responsive to continued rotation of the male threaded fastener, the rotatable attachment feature travels along the length of the such that the distance between the fin portion and the flange decreases.

10. The wall box of claim 9 wherein, in the $2^{nd}$ position, the fin portion extends at an angle of about 90 degrees with respect to the external surface of the wall box body.

11. The wall box of claim 9 wherein the wall box body defines a generally oval shape.

12. The wall box of claim 9 wherein the wall box body defines a generally rectangular shape.

13. The wall box of claim 9 wherein the flange extends about the perimeter of the open end of the wall box body.

14. The wall box of claim 9 wherein, in response to a rotation of the threaded fastener in a second direction opposite the first direction, the attachment feature travels in a downward directly along the length of the threaded fastener, releasing the hollow wall from between the fin portion and the flange.

15. The wall box of claim 14 wherein, in response to a continued rotation of the threaded fastener in the second direction, the attachment feature transitions from the $2^{nd}$ position back to the $1^{st}$ position in which the rotatable attachment feature is adjacent a side of the wall box body, thereby permitting removal of the wall box from the hollow wall.

16. The wall box of claim 9 wherein the fin portion of the attachment feature comprises a rectangular member and the drum portion of the rotatable attachment feature comprises a cylindrical member.

* * * * *